(12) United States Patent
Tang

(10) Patent No.: US 11,539,483 B2
(45) Date of Patent: Dec. 27, 2022

(54) WIRELESS COMMUNICATION METHOD AND APPARATUS

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 262 days.

(21) Appl. No.: 16/496,179

(22) PCT Filed: Mar. 20, 2017

(86) PCT No.: PCT/CN2017/077349
§ 371 (c)(1),
(2) Date: Sep. 20, 2019

(87) PCT Pub. No.: WO2018/170690
PCT Pub. Date: Sep. 27, 2018

(65) Prior Publication Data
US 2020/0162214 A1 May 21, 2020

(51) Int. Cl.
*H04L 5/00* (2006.01)
*H04W 72/04* (2009.01)
*H04W 72/12* (2009.01)

(52) U.S. Cl.
CPC ......... *H04L 5/0048* (2013.01); *H04W 72/042* (2013.01); *H04W 72/1268* (2013.01)

(58) Field of Classification Search
CPC ... H04L 5/0048; H04L 5/0094; H04L 5/0051; H04L 5/0053; H04L 5/0035; H04L 5/00;
(Continued)

(56) References Cited

U.S. PATENT DOCUMENTS 9,204,434 B2  12/2015  Chen et al.
2011/0142095 A1*  6/2011  Guo ..................... H04B 7/0684
375/135
(Continued)

FOREIGN PATENT DOCUMENTS

CN   102083033 A   6/2011
CN   102083219 A   6/2011
(Continued)

OTHER PUBLICATIONS

First Office Action of the Indian application No. 201917039348, dated Jan. 12, 2021.
(Continued)

*Primary Examiner* — Nguyen H Ngo
(74) *Attorney, Agent, or Firm* — Ladas & Parry LLP

(57) ABSTRACT

Provided in embodiments of the present application are a wireless communication method and apparatus, capable of transmitting multiple SRS types. The method comprises: a terminal apparatus receiving trigger signaling sent by a network apparatus for triggering an aperiodic sounding reference signal (SRS); the terminal apparatus determining, according to the trigger signaling, an SRS type of the aperiodic SRS; the terminal apparatus determining, according to the determined SRS type, a resource and/or transmission mode for sending the aperiodic SRS; and the terminal apparatus sending to the network apparatus, on the basis of the determined resource and/or determined transmission mode, the aperiodic SRS.

14 Claims, 4 Drawing Sheets

(58) Field of Classification Search
CPC ............. H04L 25/0202; H04L 25/0224; H04L 25/0226; H04L 25/0228; H04L 5/005; H04L 27/261; H04W 72/042; H04W 72/1268; H04W 72/046; H04W 72/12; H04W 28/18; H04W 72/02; H04W 72/04; H04W 72/0413; H04W 72/044; H04W 16/28
USPC .... 370/229, 230, 230.1, 252, 328, 329, 330, 370/465, 468
See application file for complete search history.

(56) References Cited

U.S. PATENT DOCUMENTS

| | | | | |
|---|---|---|---|---|
| 2013/0100833 | A1* | 4/2013 | Xu | H04W 52/42 370/252 |
| 2013/0163571 | A1 | 6/2013 | Ouchi | |
| 2013/0201932 | A1* | 8/2013 | Ko | H04L 5/0053 370/329 |
| 2013/0242895 | A1 | 9/2013 | Chen et al. | |
| 2013/0265978 | A1* | 10/2013 | Noh | H04L 5/0051 370/329 |
| 2013/0286994 | A1* | 10/2013 | Liu | H04W 28/18 370/329 |
| 2013/0294382 | A1 | 11/2013 | Xu et al. | |
| 2013/0329660 | A1* | 12/2013 | Noh | H04L 5/0048 370/329 |
| 2014/0106774 | A1* | 4/2014 | Siomina | H04W 64/00 455/456.1 |
| 2014/0219199 | A1* | 8/2014 | Ji | H04W 88/08 370/329 |
| 2015/0245300 | A1* | 8/2015 | Suzuki | H04W 52/247 455/522 |
| 2016/0105872 | A1* | 4/2016 | Kuo | H04W 72/0413 370/329 |
| 2016/0127100 | A1 | 5/2016 | Xu et al. | |
| 2018/0019857 | A1* | 1/2018 | Kazmi | H04L 5/14 |
| 2018/0083752 | A1 | 3/2018 | Kim et al. | |
| 2018/0124790 | A1* | 5/2018 | Yerramalli | H04W 16/14 |
| 2019/0037483 | A1 | 1/2019 | Li et al. | |
| 2019/0081751 | A1* | 3/2019 | Miao | H04B 7/0413 |
| 2019/0207731 | A1* | 7/2019 | Park | H04B 7/0639 |

FOREIGN PATENT DOCUMENTS

| | | |
|---|---|---|
| CN | 103002585 A | 3/2013 |
| CN | 103299694 A | 9/2013 |
| CN | 104137465 A | 11/2014 |
| CN | 104301923 A | 1/2015 |
| CN | 105634710 A | 6/2016 |
| CN | 106059737 A | 10/2016 |
| EP | 2592803 A1 | 5/2013 |
| EP | 3070872 A1 | 9/2016 |
| JP | 2013530644 | 7/2013 |
| KR | 20120092651 A1 | 8/2012 |
| RU | 2510575 C2 | 3/2014 |
| RU | 2610143 C2 | 2/2017 |
| WO | 2016163805 A1 | 10/2016 |

OTHER PUBLICATIONS

First Office Action of the Korean application No. 10-2019-7027747, dated Feb. 25, 2021.
Second Office Action of the Chilean application No. 201902651, dated Dec. 18, 2020.
First Office Action of the European application No. 17901752.0, dated Sep. 22, 2020.
First Office Action of the Canadian application No. 3056686, dated Oct. 29, 2020.
Guangdong OPPO Mobile Telecom, "On SRS design for NR", 3GPP TSG RAN WG1 Meeting #88, R1-1701946, Athens, Greece Feb. 13-17, 2017.
Nokia, Alcatel-Lucent Shanghai Bell, "UL SRS design considerations in NR", 3GPP TSG RAN WG1 Meeting #88 R1-1703183, Athens, Greece Feb. 13-17, 2017.
First Office Action of the Chilean application No. 201902651, dated Aug. 19, 2020.
Notice of Allowance of the Russian application No. 2019133305, dated Jul. 13, 2020.
Written Opinion of the International Search Authority in the international application No. PCT/CN2017/077349, dated Nov. 14, 2017.
Second Office Action of the European application No. 17901752.0, dated Mar. 9, 2021.
Written Opinion of the Singaporean application No. 11201908762V, dated Mar. 12, 2021.
Ericsson, On SRS design [online], 3GPP TSG RAN WG1#88 R1-1703222, Internet <URL : http://www.3gpp.org/ftp/tsg_ran/WG1_RL1/TSGR1_88/Docs/R1-1703222.zip>, Feb. 17, 2017, p. 1-9.
First Office Action of the Japanese application No. 2019-551629, dated Apr. 16, 2021.
First Office Action of the Chinese application No. 201911310456.7, dated May 7, 2021.
Guangdong Oppo Mobile Telecom: "SRS design for NR", 3GPP Draft; R1-1700552, 3rd Generation Partnership Project (3GPP), Mobile Competence Centre ; 650, Route Des Lucioles ; F-06921 Sophia-Antipolis Cedex ; France, vol. RAN WG1, No. Spokane, USA; Jan. 16, 2017-Jan. 20, 2017 Jan. 16, 2017 (Jan. 16, 2017), XP051208082, Retrieved from the Internet: URL:http://www.3gpp.org/ftp/Meetings_3GPP_SYNC/RAN1/Docs/ [retrieved on Jan. 16, 2017] * section 2 *.
Supplementary European Search Report in the European application No. 17901752.0, dated Feb. 11, 2020.
English translation of the Written Opinion of the International Search Authority in the international application No. PCT/CN2017/077349, dated Nov. 14, 2017.
International Search Report in the international application No. PCT/CN2017/077349, dated Nov. 14, 2017.
First Office Action of the Taiwanese application No. 107105079, dated May 31, 2021.
Second Office Action of the Chinese application No. 201911310456.7, dated Jul. 21, 2021.
Second Office Action of the Korean application No. 10-2019-7027747, dated Aug. 19, 2021.
Office Action of the Australian application No. 2017405379, dated Dec. 21, 2021.
First Office Action of the Indonesian application No. P00201909288, dated Feb. 3, 2022.
First Office Action of the Israeli application No. 269392, dated Feb. 20, 2022.

* cited by examiner

WIRELESS COMMUNICATION METHOD AND APPARATUS

RELATED APPLICATION

This application is an application under 35 U.S.C. 371 of International Application No. PCT/CN2017/077349 filed on Mar. 20, 2017, the entire contents of which are incorporated herein by reference.

TECHNICAL FIELD

The disclosure relates to the field of communications, and more particularly to a wireless communication method and device.

BACKGROUND

In a Long Term Evolution (LTE) system, aperiodic Sounding Reference Signal (SRS) transmission is introduced so that a base station can trigger SRS transmission of a terminal through uplink or Downlink Control Information (DCI). The terminal, after receiving SRS trigger signaling, performs SRS transmission. An SRS is mainly used to obtain uplink channel information, and is used for a network side to obtain downlink channel information based on channel reciprocity.

In a 5th-Generation (5G) system, multi-beam transmission is introduced so that a terminal can transmit different SRSs through different beams for a network device to perform uplink beam management.

In a 5G communication system, how to implement compatibility between SRS transmission for uplink beam management and SRS transmission for acquisition of uplink scheduling information is an urgent problem to be solved.

SUMMARY

Embodiments of the disclosure provide a wireless communication method and device, which can implement compatibility of transmission of multiple types of SRSs.

In a first aspect, there is provided a wireless communication method, which may include the following operations.

A terminal device receives from a network device trigger signaling for triggering an aperiodic SRS.

The terminal device determines an SRS type of the aperiodic SRS according to the trigger signaling.

The terminal device determines, according to a determined SRS type, at least one of a resource or transmission scheme for transmitting the aperiodic SRS.

The terminal device transmits the aperiodic SRS to the network device based on at least one of a determined resource or a determined transmission scheme.

In combination with the first aspect, in a possible implementation mode of the first aspect, the determined SRS type may include at least one of multiple SRS types supported by the terminal device.

In combination with the first aspect or any abovementioned possible implementation mode thereof, in a possible implementation mode of the first aspect, resources for aperiodic SRSs of different SRS types may be different; or transmission schemes for aperiodic SRSs of different SRS types may be different; or resources for aperiodic SRSs of different SRS types may be different and transmission schemes for aperiodic SRSs of different SRS types may be different.

In combination with the first aspect or any abovementioned possible implementation mode thereof, in a possible implementation mode of the first aspect, the determined SRS type may include at least one of a first SRS type or a second SRS type supported by the terminal device.

Herein, the aperiodic SRS with the first SRS type may be transmitted through multiple beams; or the aperiodic SRS with the second SRS type may be transmitted through a single beam; or the aperiodic SRS with the first SRS type may be transmitted through multiple beams and the aperiodic SRS with the second SRS type may be transmitted through a single beam.

In combination with the first aspect or any abovementioned possible implementation mode thereof, in a possible implementation mode of the first aspect, the single beam for transmitting the aperiodic SRS with the second SRS type may be a beam used for SRS transmission on an SRS resource that is indicated by a last SRS Resource Indication (SRI) received before the aperiodic SRS with the second SRS type is transmitted.

In combination with the first aspect or any abovementioned possible implementation mode thereof, in a possible implementation mode of the first aspect, the determined SRS type may include at least one of a first SRS type or a second SRS type supported by the terminal device.

Herein, one transmission of the aperiodic SRS with the first SRS type may be performed through a single antenna port; or one transmission of the aperiodic SRS with the second SRS type may be performed through multiple antenna ports; or one transmission of the aperiodic SRS with the first SRS type may be performed through a single antenna port and one transmission of the aperiodic SRS with the second SRS type may be performed through multiple antenna ports.

In combination with the first aspect or any abovementioned possible implementation mode thereof, in a possible implementation mode of the first aspect, the determined SRS type may include at least one of a first SRS type or a second SRS type supported by the terminal device.

Herein, the aperiodic SRS with the first SRS type may be transmitted multiple times; or the aperiodic SRS with the second SRS type may be transmitted one time; or the aperiodic SRS with the first SRS type may be transmitted multiple times and the aperiodic SRS with the second SRS type may be transmitted one time.

In combination with the first aspect or any abovementioned possible implementation mode thereof, in a possible implementation mode of the first aspect, the determined SRS type may include at least one of a first SRS type or a second SRS type supported by the terminal device.

Herein, the aperiodic SRS with the first SRS type may be used to determine at least one of a transmitting beam for an uplink signal or a receiving beam for an uplink signal; or the aperiodic SRS with the second SRS type may be used to obtain scheduling information for an uplink signal; or the aperiodic SRS with the first SRS type may be used to determine at least one of a transmitting beam for an uplink signal or a receiving beam for an uplink signal and the aperiodic SRS with the second SRS type may be used to obtain scheduling information for an uplink signal.

In combination with the first aspect or any abovementioned possible implementation mode thereof, in a possible implementation mode of the first aspect, the determined transmission scheme may include at least one of:

a beam for transmitting the aperiodic SRS;

a number of the beams for transmitting the aperiodic SRS;

an antenna port for transmitting the aperiodic SRS;

a number of the antenna ports for transmitting the aperiodic SRS; or a number of times for which the aperiodic SRS is transmitted.

In combination with the first aspect or any abovementioned possible implementation mode thereof, in a possible implementation mode of the first aspect, the operation that the terminal device determines, according to the determined SRS type, at least one of the resource or transmission scheme for transmitting the aperiodic SRS may include the following operations.

The terminal device determines an SRS resource set corresponding to the determined SRS type from pre-configured SRS resource sets according to the SRS type.

The terminal device determines, from the SRS resource set corresponding to the determined SRS type, an SRS resource for transmitting the aperiodic SRS.

In combination with the first aspect or any abovementioned possible implementation mode thereof, in a possible implementation mode of the first aspect, the operation that the terminal device determines, from the SRS resource set corresponding to the determined SRS type, the SRS resource for transmitting the aperiodic SRS may include the following operation.

At least one latest SRS resource of the SRS resource set corresponding to the determined SRS type after the terminal device receives the trigger signaling is determined as the SRS resource for transmitting the aperiodic SRS.

In combination with the first aspect or any abovementioned possible implementation mode thereof, in a possible implementation mode of the first aspect, the operation that the terminal device determines, from the SRS resource set corresponding to the determined SRS type, the SRS resource for transmitting the aperiodic SRS may include the following operation.

The terminal device determines, from the SRS resource set corresponding to the determined SRS type according to an SRI in the trigger signaling, the SRS resource for transmitting the aperiodic SRS.

In combination with the first aspect or any abovementioned possible implementation mode thereof, in a possible implementation mode of the first aspect, before the operation that the terminal device determines, according to the determined SRS type, at least one of the resource or transmission scheme for transmitting the aperiodic SRS, the method may further include that: the terminal device receives an SRS resource set which is pre-configured by the network device for each of the multiple SRS types supported by the terminal device.

In combination with the first aspect or any abovementioned possible implementation mode thereof, in a possible implementation mode of the first aspect, the operation that the terminal device determines the SRS type of the aperiodic SRS according to the trigger signaling may include the following operation.

The SRS type is determined according to an SRS type indication in the trigger signaling.

In combination with the first aspect or any abovementioned possible implementation mode thereof, in a possible implementation mode of the first aspect, the operation that the terminal device determines the SRS type of the aperiodic SRS according to the trigger signaling may include the following operation.

The type of the aperiodic SRS is determined according to a number of SRS resources for transmitting the aperiodic SRS, and the number of SRS resources is indicated by the trigger signaling.

In combination with the first aspect or any abovementioned possible implementation mode thereof, in a possible implementation mode of the first aspect, the operation that the terminal device determines the SRS type of the aperiodic SRS according to the trigger signaling may include the following operation.

The type of the aperiodic SRS is determined according to an SRS resource which is indicated by the trigger signaling and used for transmitting the aperiodic SRS.

In combination with the first aspect or any abovementioned possible implementation mode thereof, in a possible implementation mode of the first aspect, the operation that the terminal device determines the SRS type of the aperiodic SRS according to the trigger signaling may include the following operation.

The type of the aperiodic SRS is determined according to a number of times for which the aperiodic SRS is transmitted and the number of times is indicated by the trigger signaling.

In combination with the first aspect or any abovementioned possible implementation mode thereof, in a possible implementation mode of the first aspect, the trigger signaling may be carried through DCI or Media Access Control (MAC) signaling.

In a second aspect, there is provided a wireless communication method, which may include the following operations.

A network device generates trigger signaling according to an SRS type of an aperiodic SRS to be transmitted by a terminal device.

The network device transmits the trigger signaling to the terminal device.

The network device determines, according to the SRS type of the aperiodic SRS, at least one of a resource or transmission scheme used by the terminal device to transmit the aperiodic SRS.

The network device receives the aperiodic SRS from the terminal device based on at least one of a determined resource or a determined transmission scheme.

In combination with the second aspect, in a possible implementation mode of the second aspect, the SRS type of the aperiodic SRS may include at least one of multiple SRS types supported by the terminal device.

In combination with the second aspect or any abovementioned possible implementation mode thereof, in a possible implementation mode of the second aspect, resources used by the terminal device to transmit aperiodic SRSs of different SRS types may be different; or transmission schemes used by the terminal device to transmit aperiodic SRSs of different SRS types may be different; or resources used by the terminal device to transmit aperiodic SRSs of different SRS types may be different and transmission schemes used by the terminal device to transmit aperiodic SRSs of different SRS types may be different.

In combination with the second aspect or any abovementioned possible implementation mode thereof, in a possible implementation mode of the second aspect, the determined transmission scheme may include at least one of:

a beam used by the terminal device to transmit the aperiodic SRS;

a number of beams used by the terminal device to transmit the aperiodic SRS;

an antenna port used by the terminal device to transmit the aperiodic SRS;

a number of antenna ports used by the terminal device to transmit the aperiodic SRS; or a number of times for which the aperiodic SRS is transmitted by the terminal device.

In a third aspect, there is provided a terminal device, which may include units configured to perform the method in the first aspect or any possible implementation mode thereof.

In a fourth aspect, there is provided a network device, which may include units configured to perform the method in the second aspect or any possible implementation mode thereof.

In a fifth aspect, there is provided a terminal device, which may include a memory and a processor. The memory stores an instruction, and the processor is configured to call the instruction stored in the memory to execute the method in the first aspect or any optional implementation mode thereof.

In a sixth aspect, there is provided a network device, which may include a memory and a processor. The memory stores an instruction, and the processor is configured to call the instruction stored in the memory to execute the method in the second aspect or any optional implementation mode thereof.

In a seventh aspect, there is provided a computer-readable medium, which stores a program code configured to be executed by a terminal device, and the program code includes an instruction configured to execute the method in the first aspect or each implementation mode thereof or includes an instruction configured to execute the method in the second aspect or each implementation mode thereof.

In an eighth aspect, there is provided a system chip, which includes an input interface, an output interface, a processor and a memory. The processor is configured to execute a code in the memory. When the code is executed, the processor may execute the method in the first aspect and each implementation mode or execute the method in the second aspect and each implementation mode.

Accordingly, in the embodiments of the disclosure, the terminal device may determine the SRS type of the aperiodic SRS according to the trigger signaling which is transmitted by the network device and used for triggering the aperiodic SRS, and thus transmission of SRSs of different types between the terminal device and the network device may be implemented; and moreover, the terminal device determines, according to the determined SRS type, at least one of the resource or transmission scheme used to transmit the aperiodic SRS, and thus different SRS types may support different configurations. Therefore, SRS requirements of different scenarios may be met.

BRIEF DESCRIPTION OF DRAWINGS

In order to describe the technical solutions of the embodiments of the disclosure more clearly, the drawings required to be used in descriptions about the embodiments or a conventional art will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 1:
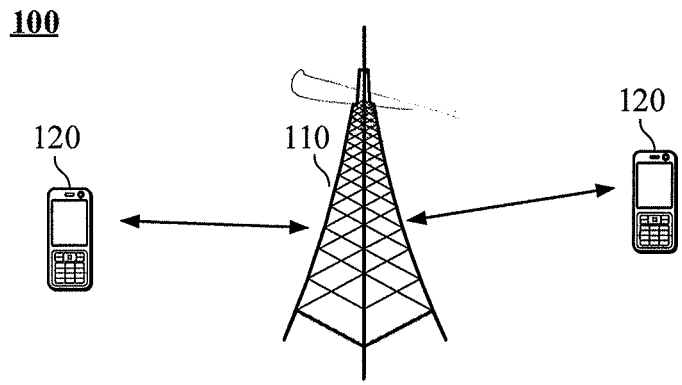
FIG. 1 is a diagram of a wireless communication system according to an embodiment of the disclosure.

FIG. 1 illustrates a wireless communication system 100 to which the embodiments of the disclosure are applied. The wireless communication system 100 may include a network device 110. The network device 110 may be a device communicating with a terminal device. The network device 110 may provide communication coverage for a specific geographical region and may communicate with a terminal device (for example, User Equipment (UE)) in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle-mounted device, a wearable device, a network-side device in a future 5G network, a network device in a future evolved Public Land Mobile Network (PLMN) or the like.

The wireless communication system 100 further includes at least one terminal device 120 within the coverage of the network device 110. The terminal devices 120 may be mobile or fixed. Optionally, the terminal device 120 may be an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

Optionally, the terminal devices 120 may perform Device to Device (D2D) communication.

Optionally, the 5G system or network may also be called a New Radio (NR) system or network.

A network device and two terminal devices are exemplarily illustrated in FIG. 1. Optionally, the wireless communication system 100 may include multiple network devices and another number of terminal devices may be included in coverage of each network device. There are no limits made thereto in the embodiments of the disclosure.

Optionally, the wireless communication system 100 may further include another network entity such as a network controller and a mobility management entity. There are no limits made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Figure 2:
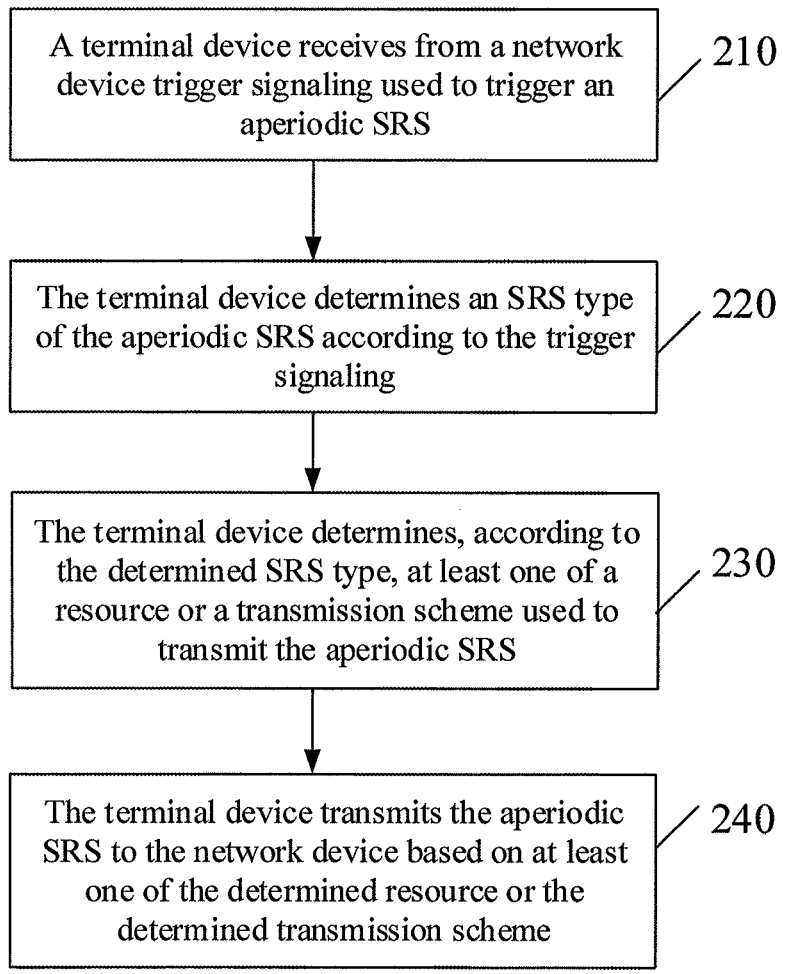
FIG. 2 is a flowchart of a wireless communication method according to an embodiment of the disclosure.

FIG. 2 is a flowchart of a wireless communication method 200 according to an embodiment of the disclosure. The method 200 may optionally be applied, but not limited, to the system illustrated in FIG. 1. As illustrated in FIG. 2, the method 200 includes the following contents.

In 210, a terminal device receives from a network device trigger signaling used to trigger an aperiodic SRS.

Optionally, the trigger signaling is carried through DCI or MAC signaling.

Optionally, the aperiodic SRS may be an SRS triggered by the trigger signaling, may be transmitted one time and may also be transmitted for multiple times.

In 220, the terminal device determines an SRS type of the aperiodic SRS according to the trigger signaling.

Optionally, a determined SRS type includes at least one of multiple SRS types supported by the terminal device.

Optionally, resources for aperiodic SRSs of different SRS types are different; or transmission schemes for aperiodic SRSs of different SRS types are different; or resources for aperiodic SRSs of different SRS types are different and transmission schemes for aperiodic SRSs of different SRS types are different.

For example, the number of SRS resources corresponding to different SRS types is different; or configurations of SRS resources corresponding to different SRS types are different; or the number of SRS resources corresponding to different SRS types is different and configurations of SRS resources corresponding to different SRS types are different. Or different SRS types correspond to at least one of: different antenna ports, different beams or different number of times of transmissions.

Optionally, a determined SRS type includes at least one of a first SRS type or a second SRS type supported by the terminal device.

Optionally, the first SRS type meets at least one of the following conditions:

the aperiodic SRS with the first SRS type is transmitted through multiple beams;

one transmission of the aperiodic SRS with the first SRS type is performed through a single antenna port;

the aperiodic SRS with the first SRS type is transmitted multiple times; or the aperiodic SRS with the first SRS type is used to determine at least one of a transmitting beam for an uplink signal or a receiving beam for the uplink signal. For example, the terminal device may transmit SRSs through different beams, and the network device detects the SRSs for which different beams are used to find the SRS with best receiving quality and indicates the SRS with best receiving quality to the terminal device.

Optionally, the terminal may adopt the beam for the best SRS for transmission of another uplink signal, for example, for transmission of uplink data and control information or transmission of the aperiodic SRS with the second SRS type.

Optionally, the multiple beams used to transmit the aperiodic SRS with the first SRS type may be multiple beams determined by the terminal device, may also be multiple beams pre-configured by a network side for the terminal device, and may also be multiple beams selected by the terminal device from a beam set pre-configured by the network side.

Optionally, when the number of times of transmissions of the aperiodic SRS with the first SRS type, i.e., the number of times for which the aperiodic SRS with the first SRS type is transmitted, is multiple, different time-domain resource units may be adopted for different transmissions of the aperiodic SRS. Herein, a time-domain resource unit may be a sub-frame, a slot, a mini-slot or an Orthogonal Frequency Division Multiplexing (OFDM) symbol.

For example, if the network device pre-configures for the terminal device a periodic SRS resource for transmission of the aperiodic SRS, the aperiodic SRS transmitted for N times may occupy N latest resources of the SRS resource after triggering.

Optionally, when the number of times of transmissions of the aperiodic SRS with the first SRS type is multiple, different beams may be adopted for different transmissions of the aperiodic SRS or the same beam may be adopted for different transmissions of the aperiodic SRS, which may specifically be configured by the network device.

Optionally, the second SRS type meets at least one of the following conditions:

the aperiodic SRS with the second SRS type is transmitted through a single beam;

one transmission of the aperiodic SRS with the second SRS type is performed through multiple antenna ports;

the aperiodic SRS with the second SRS type is transmitted one time; or the aperiodic SRS with the second SRS type is used to obtain scheduling information for an uplink signal, for example, at least including at least one of a Rank Indicator (RI), a Pre-coding Matrix Index (PMI), a Channel Quality Indicator (CQI) or frequency selective scheduling information.

Optionally, the single beam used to transmit the aperiodic SRS with the second SRS type is a beam used for SRS transmission on an SRS resource that is indicated by a last SRI received before the aperiodic SRS with the second SRS type is transmitted.

Specifically, the terminal device, before receiving the SRI, may transmit an SRS on the SRS resource set including the SRS resource indicated by the SRI, and each SRS resource adopts one beam for transmission. The SRI is usually indicated to the terminal device through DCI that schedules uplink data transmission or uplink control information transmission, and for example, may be indicated to the terminal through DCI that triggers the aperiodic SRS.

Optionally, a resource for an SRS with the first SRS type does not overlap with a resource for an SRS with the second SRS type.

For example, the network device may configure five SRS resources, the terminal device may transmit an SRS with the second SRS type based on one SRS resource of the five SRS resources, and in such case, an SRS resource set corresponding to the second SRS type includes one SRS resource. The terminal device may transmit the SRS with the first SRS type based on other four SRS resources, and in such case, an SRS resource set corresponding to the first SRS type includes four SRS resources.

Optionally, the network device pre-configures the number of antenna ports for different SRS types; or the network device configures the number of antenna ports for the second SRS type, and the agreed and fixed number of antenna ports is adopted for the first SRS type.

For example, a fixed single port may be adopted to transmit the SRS with the first SRS type; and the number of antenna ports configured by the network device may be adopted for transmission of the SRS with the second SRS type, may be one port and may also be 2, 4 and 8 ports.

Optionally, antenna ports for different SRS types may be non-overlapped antenna ports.

For example, antenna port {0} is adopted for transmission of the SRS with the first SRS type, and antenna port(s) {1} or {1, 2} or {1, 2, 3, 4} is/are adopted for transmission of the SRS with the second SRS type. Or, antenna port(s) {0} or {0, 1} is/are adopted for transmission of the SRS with the first SRS type, and antenna port(s) {2} or {2, 3} or {2, 3, 4, 5} is/are adopted for transmission of the SRS with the second SRS type.

Optionally, different beams are adopted to transmit the SRS with the first SRS type, for different antenna ports in the SRS resource that is used to transmit the aperiodic SRS with the first SRS type. Or the same beam is adopted to transmit the SRS with the second SRS type, for different antenna ports in the SRS resource that is used to transmit the aperiodic SRS with the second SRS type. Or different beams are adopted to transmit the SRS with the first SRS type, for different antenna ports in the SRS resource that is used to transmit the aperiodic SRS with the first SRS type; and the same beam is adopted to transmit the SRS with the second SRS type, for different antenna ports in the SRS resource that is used to transmit the aperiodic SRS with the second SRS type.

For example, the same SRS resource is adopted to transmit the aperiodic SRSs of the two SRS types, and the SRS resource has four antenna ports. When the type of the aperiodic SRS is the first SRS type, four different beams are adopted, for the four ports, to transmit the SRS; and when the type of the aperiodic SRS is the second SRS type, the same beam is adopted, for the four ports, to transmit the SRS.

Transmission of the aperiodic SRS has been described above with the first SRS type and second SRS type of the multiple SRS types supported by the terminal device as examples. How to determine the SRS type of the aperiodic SRS according to the trigger signaling will be introduced below.

In an implementation mode, the SRS type is determined according to an SRS type indication in the trigger signaling.

For example, an SRS type 1 or an SRS type 2 is indicated with 1 bit in the trigger signaling. Or, two bits are used for the two SRS types in a bitmap manner, and if a present SRS type is activated, the corresponding bit is configured to be 0. For example, 11 may be adopted to represent activation of transmission of aperiodic SRSs of the two SRS types.

In an implementation mode, the type of the aperiodic SRS is determined according to the number of SRS resources for transmitting the aperiodic SRS and the number of SRS resources is indicated by the trigger signaling.

For example, if the trigger signaling indicates one SRS resource of N preset SRS resources, the terminal determines that the SRS type is the SRS type 1; and if multiple SRS resources of the N preset SRS resources are indicated, the terminal determines that the SRS type is the SRS type 2. There are also other corresponding relationships.

In an implementation mode, the type of the aperiodic SRS is determined according to an SRS resource which is indicated by the trigger signaling and used to transmit the aperiodic SRS.

For example, the network device may configure five SRS resources, the SRS resources 1, 2, 3 and 4 are configured for transmission of the SRS type 2 and the SRS resource 5 is configured for transmission of the SRS type 1. If the SRS resource which is indicated by the trigger signaling and used to transmit the aperiodic SRS is the SRS resource 2, the aperiodic SRS with the SRS type 2 may be transmitted.

In an implementation mode, the type of the aperiodic SRS is determined according to the number of times for which the aperiodic SRS is transmitted, and the number of times is indicated by the trigger signaling.

For example, if the trigger signaling indicates that the number of times of transmissions (i.e., the number of times for which the aperiodic SRS is transmitted) is multiple, the terminal determines the type of the aperiodic SRS as the SRS type 1; and if the trigger signaling indicates that the number of times of transmissions is one time, the terminal determines the type of the aperiodic SRS as the SRS type 2.

In 230, the terminal device determines, according to the determined SRS type, at least one of a resource or transmission scheme used to transmit the aperiodic SRS.

Optionally, a determined transmission scheme includes at least one of:

a beam used to transmit the aperiodic SRS;

the number of beams used to transmit the aperiodic SRS;

an antenna port used to transmit the aperiodic SRS;

the number of antenna ports used to transmit the aperiodic SRS; or the number of times for which the aperiodic SRS is transmitted.

Optionally, the terminal device determines an SRS resource set corresponding to the determined SRS type from pre-configured SRS resource sets according to the SRS type; and the terminal device determines, from the SRS resource set corresponding to the determined SRS type, an SRS resource used to transmit the aperiodic SRS.

Specifically, at least one latest SRS resource of the SRS resource set corresponding to the determined SRS type after the terminal device receives the trigger signaling is determined as the SRS resource for transmitting the aperiodic SRS.

For example, the network device pre-configures, for the first SRS type, N periodic SRS resources for transmitting the aperiodic SRS, i.e., the SRS resource 1, the SRS resource 2, . . . , the SRS resource N. Each SRS resource includes configurations of a period, an offset, power and the like. The terminal, after receiving the trigger signaling, determines that the present SRS type is the first SRS type, and the SRS resource for the aperiodic SRS is the latest resource of each of the N SRS resources, and the terminal transmits the aperiodic SRS on the N determined resources.

For example, the network device pre-configures, for the second SRS type, one periodic SRS resource used to transmit the aperiodic SRS, and the SRS resource includes configurations of a period, an offset, a port, power and the like. The terminal, after receiving the trigger signaling, determines that the present SRS type is the second SRS type, and then the SRS resource for the aperiodic SRS is the latest resource of the SRS resource.

Optionally, the SRS resource set configured for each of the multiple SRS types supported by the terminal device may be pre-configured by the network device for the terminal device.

Optionally, the terminal device determines, from the SRS resource set corresponding to the determined SRS type according to an SRI in the trigger signaling, the SRS resource used to transmit the aperiodic SRS.

In 240, the terminal device transmits the aperiodic SRS to the network device based on at least one of the determined resource or the determined transmission scheme.

Figure 3:
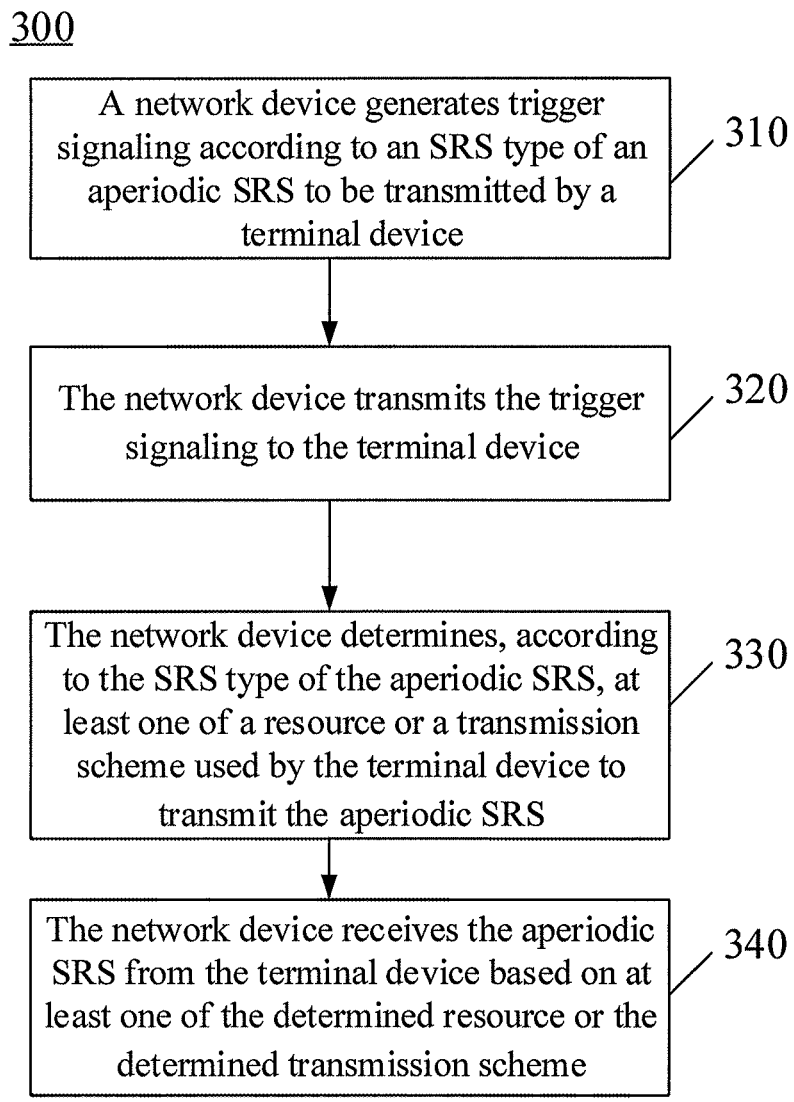
FIG. 3 is a flowchart of a wireless communication method according to an embodiment of the disclosure.

FIG. 3 is a flowchart of a wireless communication method 300 according to an embodiment of the disclosure. The method 300 may optionally be applied, but not limited, to the system illustrated in FIG. 1. As illustrated in FIG. 3, the method 300 includes the following contents.

In 310, a network device generates trigger signaling according to an SRS type of an aperiodic SRS to be transmitted by a terminal device.

Optionally, the SRS type of the aperiodic SRS includes at least one of multiple SRS types supported by the terminal device.

Optionally, resources used by the terminal device to transmit aperiodic SRSs of different SRS types are different; or transmission schemes used by the terminal device to transmit aperiodic SRSs of different SRS types are different; or resources used by the terminal device to transmit aperiodic SRSs of different SRS types are different and transmission schemes used by the terminal device to transmit aperiodic SRSs of different SRS types are different.

Optionally, the SRS type of the aperiodic SRS includes at least one of a first SRS type or a second SRS type supported by the terminal device.

Optionally, the first SRS type meets at least one of the following conditions:
the aperiodic SRS with the first SRS type is transmitted through multiple beams;
one transmission of the aperiodic SRS with the first SRS type is performed through a single antenna port;
the aperiodic SRS with the first SRS type is transmitted multiple times; or
the aperiodic SRS with the first SRS type is used to determine at least one of a transmitting beam for an uplink signal or a receiving beam for an uplink signal.

Optionally, the second SRS type meets at least one of the following conditions:
the aperiodic SRS with the second SRS type is transmitted through a single beam;
one transmission of the aperiodic SRS with the second SRS type is performed through multiple antenna ports;
the aperiodic SRS with the second SRS type is transmitted one time; or
the aperiodic SRS with the second SRS type is used to obtain scheduling information for an uplink signal.

Optionally, the single beam used by the terminal device to transmit the aperiodic SRS with the second SRS type is a beam used for SRS transmission on an SRS resource that is indicated by a last SRI transmitted before the aperiodic SRS with the second SRS type is received.

Optionally, the network device determines at least one of the transmitting beam for the uplink signal or the receiving beam for the uplink signal according to the aperiodic SRS with the first SRS type; or the network device obtains the scheduling information for the uplink signal according to the aperiodic SRS with the second SRS type; or the network device determines at least one of the transmitting beam for the uplink signal or the receiving beam for the uplink signal according to the aperiodic SRS with the first SRS type and the network device obtains the scheduling information for the uplink signal according to the aperiodic SRS with the second SRS type.

In 320, the network device transmits the trigger signaling to the terminal device.

Optionally, the trigger signaling is carried through DCI or MAC signaling.

Optionally, the trigger signaling contains SRS type indication used to indicate the SRS type of the aperiodic SRS.

Optionally, the trigger signaling contains the number of SRS resources used for the terminal device to transmit the aperiodic SRS.

Optionally, the trigger signaling contains the SRS resource used for the terminal device to transmit the aperiodic SRS.

Optionally, the trigger signaling contains the number of times of transmissions of the aperiodic SRS.

In 330, the network device determines, according to the SRS type of the aperiodic SRS, at least one of a resource or transmission scheme used by the terminal device to transmit the aperiodic SRS.

Optionally, a determined transmission scheme includes at least one of:
a beam used by the terminal device to transmit the aperiodic SRS;
the number of beams used by the terminal device to transmit the aperiodic SRS;
an antenna port used by the terminal device to transmit the aperiodic SRS;
the number of antenna ports used by the terminal device to transmit the aperiodic SRS; or
the number of times for which the aperiodic SRS is transmitted by the terminal device.

Optionally, the network device pre-stores an SRS resource set configured for each of the multiple SRS types supported by the terminal device; the network device determines the SRS resource set corresponding to the SRS type of the aperiodic SRS from pre-stored SRS resource sets according to the SRS type of the aperiodic SRS; and the network device determines, from the SRS resource set corresponding to the SRS type of the aperiodic SRS, the SRS resource used by the terminal device to transmit the aperiodic SRS.

Specifically, at least one latest SRS resource of the SRS resource set corresponding to the SRS type of the aperiodic SRS after transmitting the trigger signaling is determined as the SRS resource used by the terminal device to transmit the aperiodic SRS.

In 340, the network device receives the aperiodic SRS from the terminal device based on at least one of the determined resource or the determined transmission scheme.

Accordingly, in the embodiments of the disclosure, the terminal device may determine the SRS type of the aperiodic SRS according to the trigger signaling that is transmitted by the network device and used to triggering the aperiodic SRS, and thus transmission of SRSs of different types between the terminal device and the network device may be implemented; and moreover, the terminal device determines, according to the determined SRS type, at least one of the resource or transmission scheme used to transmit the aperiodic SRS, and thus different SRS types may support different configurations. Therefore, SRS requirements of different scenarios may be met.

Figure 4:
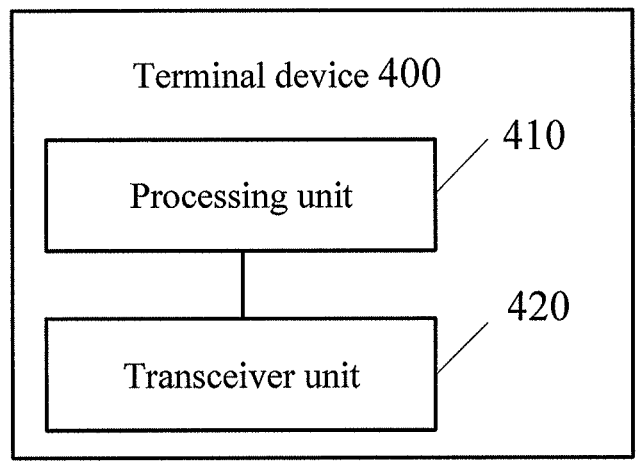
FIG. 4 is a block diagram of a terminal device according to an embodiment of the disclosure.

FIG. 4 is a block diagram of a terminal device 400 according to an embodiment of the disclosure. As illustrated in FIG. 4, the terminal device 400 includes a processing unit 410 and a transceiver unit 420.

The transceiver unit 420 is configured to receive from a network device trigger signaling used to trigger an aperiodic SRS.

The processing unit 410 is configured to determine an SRS type of the aperiodic SRS according to the trigger signaling and determine, according to a determined SRS type, at least one of a resource or transmission scheme used to transmit the aperiodic SRS.

The transceiver unit 420 is further configured to transmit the aperiodic SRS to the network device based on at least one of a determined resource or a determined transmission scheme.

Optionally, the determined SRS type includes at least one of multiple SRS types supported by the terminal device.

Optionally, resources for aperiodic SRSs of different SRS types are different; or transmission schemes for aperiodic SRSs of different SRS types are different; or resources for aperiodic SRSs of different SRS types are different and transmission schemes for aperiodic SRSs of different SRS types are different.

Optionally, the determined SRS type includes at least one of a first SRS type or a second SRS type supported by the terminal device.

Herein, the aperiodic SRS with the first SRS type is transmitted through multiple beams; or the aperiodic SRS with the second SRS type is transmitted through a single beam; or the aperiodic SRS with the first SRS type is transmitted through multiple beams and the aperiodic SRS with the second SRS type is transmitted through a single beam.

Optionally, the single beam used to transmit the aperiodic SRS with the second SRS type is a beam used for SRS transmission on an SRS resource that is indicated by a last SRI received before the aperiodic SRS with the second SRS type is transmitted.

Optionally, the determined SRS type includes at least one of a first SRS type or a second SRS type supported by the terminal device.

Herein, one transmission of the aperiodic SRS with the first SRS type is performed through a single antenna port; or one transmission of the aperiodic SRS with the second SRS type is performed through multiple antenna ports; or one transmission of the aperiodic SRS with the first SRS type is performed through a single antenna port and one transmission of the aperiodic SRS with the second SRS type is performed through multiple antenna ports.

Optionally, the determined SRS type includes at least one of a first SRS type or a second SRS type supported by the terminal device.

Herein, the aperiodic SRS with the first SRS type is transmitted multiple times; or the aperiodic SRS with the second SRS type is transmitted one time; or the aperiodic SRS with the first SRS type is transmitted multiple times and the aperiodic SRS with the second SRS type is transmitted one time.

Optionally, the determined SRS type includes at least one of a first SRS type or a second SRS type supported by the terminal device.

Herein, the aperiodic SRS with the first SRS type is used to determine at least one of a transmitting beam for an uplink signal or a receiving beam for an uplink signal; or the aperiodic SRS with the second SRS type is used to obtain scheduling information for an uplink signal; or the aperiodic SRS with the first SRS type is used to determine at least one of a transmitting beam for an uplink signal or a receiving beam for an uplink signal and the aperiodic SRS with the second SRS type is used to obtain scheduling information for an uplink signal.

Optionally, the determined transmission scheme includes at least one of:
    a beam used to transmit the aperiodic SRS;
    the number of beams used to transmit the aperiodic SRS;
    an antenna port used to transmit the aperiodic SRS;
    the number of antenna ports used to transmit the aperiodic SRS; or
    the number of times for which the aperiodic SRS is transmitted.

Optionally, the processing unit 410 is further configured to: determine an SRS resource set corresponding to the determined SRS type from pre-configured SRS resource sets according to the SRS type; and determine, from the SRS resource set corresponding to the determined SRS type, an SRS resource used to transmit the aperiodic SRS.

Optionally, the processing unit 410 is further configured to: determine, as the SRS resource used to transmit the aperiodic SRS, at least one latest SRS resource of the SRS resource set corresponding to the determined SRS type after the terminal device receives the trigger signaling.

Optionally, the processing unit 410 is further configured to determine, from the SRS resource set corresponding to the determined SRS type according to an SRI in the trigger signaling, the SRS resource used to transmit the aperiodic SRS.

Optionally, the transceiver unit 420 is further configured to receive an SRS resource set which is pre-configured by the network device for each of the multiple SRS types supported by the terminal device.

Optionally, the processing unit 410 is further configured to determine the SRS type according to an SRS type indication in the trigger signaling.

Optionally, the processing unit 410 is further configured to determine the type of the aperiodic SRS according to the number of SRS resources for transmitting the aperiodic SRS, and the number of SRS resources is indicated by the trigger signaling.

Optionally, the processing unit 410 is further configured to determine the type of the aperiodic SRS according to an SRS resource which is indicated by the trigger signaling and used to transmit the aperiodic SRS.

Optionally, the processing unit 410 is further configured to determine the type of the aperiodic SRS according to the number of times for which the aperiodic SRS is transmitted, and the number of times is indicated by the trigger signaling.

Optionally, the trigger signaling is carried through DCI or MAC signaling.

The terminal device 400 may correspond to the terminal device in the method 200, may realize corresponding functions of the terminal device in the method 200 and, for simplicity, will not be elaborated herein.

Figure 5:
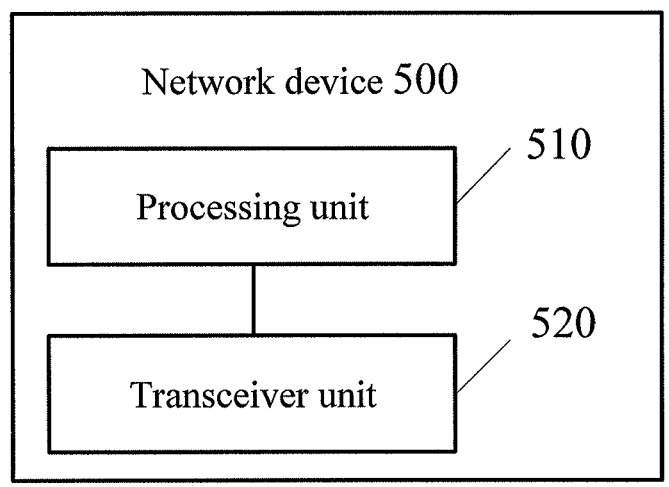
FIG. 5 is a block diagram of a network device according to an embodiment of the disclosure.

FIG. 5 is a block diagram of a network device 500 according to an embodiment of the disclosure. As illustrated in FIG. 5, the network device 500 includes a processing unit 510 and a transceiver unit 520.

The processing unit 510 is configured to generate trigger signaling according to an SRS type of an aperiodic SRS to be transmitted by a terminal device.

The transceiver unit 520 is configured to transmit the trigger signaling to the terminal device.

The processing unit 510 is further configured to determine, according to the SRS type of the aperiodic SRS, at least one of a resource or transmission scheme used by the terminal device to transmit the aperiodic SRS.

The transceiver unit 520 is further configured to receive the aperiodic SRS from the terminal device based on at least one of a determined resource or a determined transmission scheme.

Optionally, the SRS type of the aperiodic SRS includes at least one of multiple SRS types supported by the terminal device.

Optionally, resources used by the terminal device to transmit aperiodic SRSs of different SRS types are different; or transmission schemes used by the terminal device to transmit aperiodic SRSs of different SRS types are different; or resources used by the terminal device to transmit aperiodic SRSs of different SRS types are different and transmission schemes used by the terminal device to transmit aperiodic SRSs of different SRS types are different.

Optionally, the determined transmission scheme includes at least one of:

a beam used by the terminal device to transmit the aperiodic SRS;

the number of beams used by the terminal device to transmit the aperiodic SRS;

an antenna port used by the terminal device to transmit the aperiodic SRS;

the number of antenna ports used by the terminal device to transmit the aperiodic SRS; or the number of times for which the aperiodic SRS is transmitted by the terminal device.

The network device 500 may correspond to the network device in the method 300, may realize corresponding functions of the network device in the method 300 and, for simplicity, will not be elaborated herein.

Figure 6:
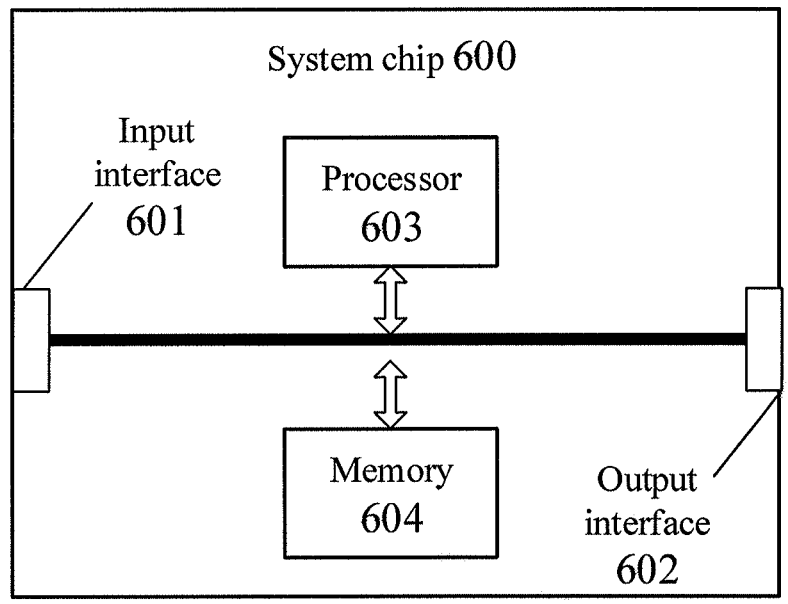
FIG. 6 is a block diagram of a system chip according to an embodiment of the disclosure.

FIG. 6 is a structure diagram of a system chip 600 according to an embodiment of the disclosure. The system chip 600 of FIG. 6 includes an input interface 601, output interface 602, processor 603 and memory 604 which may be connected through an internal communication connecting line. The processor 603 is configured to execute a code in the memory 604.

Optionally, when the code is executed, the processor 603 implements the method executed by the terminal device in the method 200 illustrated in FIG. 2. For simplicity, no more elaborations will be made herein.

Optionally, when the code is executed, the processor 603 implements the method executed by the network device in the method 300 illustrated in FIG. 3. For simplicity, no more elaborations will be made herein.

Figure 7:
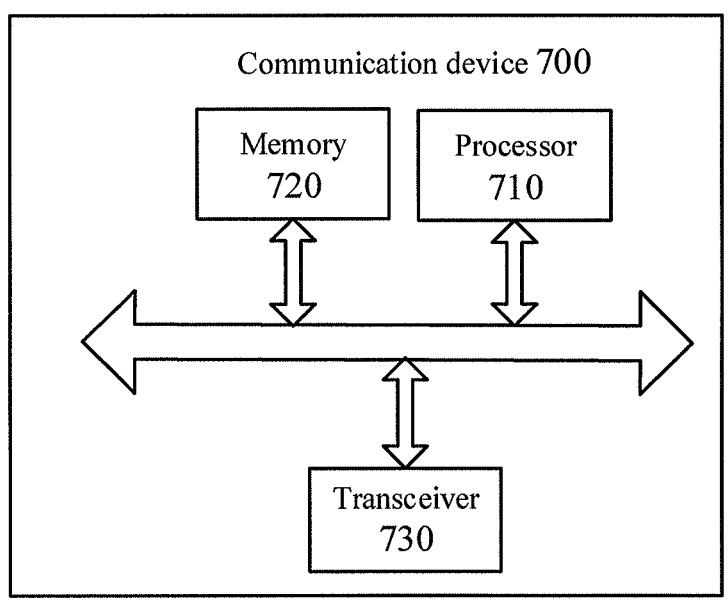
FIG. 7 is a block diagram of a communication device according to an embodiment of the disclosure.

FIG. 7 is a block diagram of a communication device 700 according to an embodiment of the disclosure. As illustrated in FIG. 7, the communication device 700 includes a processor 710 and a memory 720. Herein, the memory 720 may store a program code, and the processor 710 may execute the program code stored in the memory 720.

Optionally, as illustrated in FIG. 7, the communication device 700 may include a transceiver 730, and the processor 710 may control the transceiver 730 for external communication.

Optionally, the processor 710 may call the program code stored in the memory 720 to execute corresponding operations of the terminal device in the method 200 illustrated in FIG. 2. For similarity, no more elaborations will be made herein.

Optionally, the processor 710 may call the program code stored in the memory 720 to execute corresponding operations of the network device in the method 300 illustrated in FIG. 3. For similarity, no more elaborations will be made herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, devices and units described above may refer to the corresponding processes in the method embodiments and will not be elaborated herein for convenient and brief description.

In some embodiments provided by the disclosure, it is to be understood that the disclosed system, devices and methods may be implemented in another manner. For example, the device embodiments described above are only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the devices or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected according to a practical requirement to achieve the purpose of the solutions of the embodiments.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the related art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes, such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A wireless communication method, comprising:
receiving, by a terminal device from a network device, trigger signaling for triggering an aperiodic Sounding Reference Signal (SRS);
determining, by the terminal device, an aperiodic SRS type from a plurality of aperiodic SRS types of the aperiodic SRS according to the trigger signaling, wherein the plurality of aperiodic SRS types comprises a first aperiodic SRS type or a second aperiodic SRS type supported by the terminal device, and wherein the first aperiodic SRS type is used to determine at least one of a transmitting beam for an uplink signal or a receiving beam of the network device for an uplink signal and the second aperiodic SRS type is used to obtain scheduling information for an uplink signal;
determining, by the terminal device according to the determined aperiodic SRS type, at least one of a resource or a transmission scheme for transmitting the aperiodic SRS; and
transmitting, by the terminal device, the aperiodic SRS to the network device based on at least one of a determined resource or a determined transmission scheme,
wherein determining the aperiodic SRS type of the aperiodic SRS according to the trigger signaling comprises:
determining the aperiodic SRS type of the aperiodic SRS according to a number of times for which the aperiodic SRS is transmitted, the number of times being indicated by the trigger signaling.

2. The method of claim 1, wherein
a resource for the first aperiodic SRS type is different from a resource for the second aperiodic SRS type; or
a transmission scheme for the first aperiodic SRS type is different from a transmission scheme for the second aperiodic SRS type; or
a resource for the first aperiodic SRS type is different from a resource for the second aperiodic SRS type and a transmission scheme for the first aperiodic SRS type is different from a transmission scheme for the second aperiodic SRS type.

3. The method of claim 2, wherein
the aperiodic SRS with the first aperiodic SRS type is transmitted through a plurality of beams; or
the aperiodic SRS with the second aperiodic SRS type is transmitted through a single beam; or
the aperiodic SRS with the first aperiodic SRS type is transmitted through a plurality of beams and the aperiodic SRS with the second aperiodic SRS type is transmitted through a single beam.

4. The method of claim 2,
wherein the aperiodic SRS with the first aperiodic SRS type is transmitted multiple times; or
the aperiodic SRS with the second aperiodic SRS type is transmitted one time; or
the aperiodic SRS with the first aperiodic SRS type is transmitted multiple times and the aperiodic SRS of the second aperiodic SRS type is transmitted one time.

5. The method of claim 2: wherein
one transmission of the aperiodic SRS with the first aperiodic SRS type is performed through a single antenna port; or
one transmission of the aperiodic SRS with the second aperiodic SRS type is performed through a plurality of antenna ports; or
one transmission of the aperiodic SRS with the first aperiodic SRS type is performed through a single antenna port and one transmission of the aperiodic SRS with the second aperiodic SRS type is performed through a plurality of antenna ports.

6. The method of claim 1, wherein the determined transmission scheme comprises at least one of:
a beam used to transmit the aperiodic SRS;
a number of beams used to transmit the aperiodic SRS;
an antenna port used to transmit the aperiodic SRS;
a number of antenna ports used to transmit the aperiodic SRS; or
a number of times for which the aperiodic SRS is transmitted.

7. The method of claim 1, wherein the trigger signaling is carried through Downlink Control Information (DCI) or Media Access Control (MAC) signaling.

8. A terminal device, comprising a processor and a transceiver, wherein
the transceiver is configured to receive from a network device trigger signaling for triggering an aperiodic Sounding Reference Signal (SRS);
the processor is configured to:
determine an aperiodic SRS type from a plurality of aperiodic SRS types of the aperiodic SRS according to the trigger signaling, wherein the plurality of aperiodic SRS types comprises a first aperiodic SRS type or a second aperiodic SRS type supported by the terminal device, and wherein the first aperiodic SRS type is used to determine at least one of a transmitting beam for an uplink signal or a receiving beam of the network device for an uplink signal and the second aperiodic SRS type is used to obtain scheduling information for an uplink signal; and
determine, according to the determined aperiodic SRS type, at least one of a resource or a transmission scheme for transmitting the aperiodic SRS; and
the transceiver is further configured to transmit the aperiodic SRS to the network device based on at least one of a determined resource or a determined transmission scheme,
wherein the processor is further configured to determine the aperiodic SRS type of the aperiodic SRS according to a number of times for which the aperiodic SRS is transmitted, the number of times being indicated by the trigger signaling.

9. The terminal device of claim 8, wherein
a resource for the first aperiodic SRS type is different from a resource for the second aperiodic SRS type; or
a transmission scheme for the first aperiodic SRS type is different from a transmission scheme for the second aperiodic SRS type; or
a resource for the first aperiodic SRS type is different from a resource for the second aperiodic SRS type and a transmission scheme for the first aperiodic SRS type is different from a transmission scheme for the second aperiodic SRS type.

10. The terminal device of claim 9,
wherein the aperiodic SRS with the first aperiodic SRS type is transmitted through a plurality of beams; or the aperiodic SRS with the second aperiodic SRS type is transmitted through a single beam; or the aperiodic SRS with the first aperiodic SRS type is transmitted through a plurality of beams and the aperiodic SRS with the second aperiodic SRS type is transmitted through a single beam.

11. The terminal device acclaim 9, wherein the aperiodic SRS with the first aperiodic SRS type is transmitted multiple times; or the aperiodic SRS with the second aperiodic SRS type is transmitted one time; or the aperiodic SRS with the first aperiodic SRS type is transmitted multiple times and the aperiodic SRS with the second aperiodic SRS type is transmitted one time.

12. The terminal device of claim 9, wherein one transmission of the aperiodic SRS with the first aperiodic SIRS type is performed through a single antenna port; or one transmission of the aperiodic SRS with the second aperiodic SRS type is performed through a plurality of antenna ports; or one transmission of the aperiodic SIRS with the first aperiodic SRS type is performed through a single antenna port and one transmission of the aperiodic SRS with the second aperiodic SRS type is performed through a plurality of antenna ports.

13. The terminal device of claim 8, wherein the determined transmission scheme comprises at least one of:

a beam used to transmit the aperiodic SRS;

a number of beams used to transmit the aperiodic SRS;

an antenna port used to transmit the aperiodic SRS;

a number of antenna ports used to transmit the aperiodic SRS; or a number of times for which the aperiodic SRS is transmitted.

14. The terminal device of claim 8, wherein the trigger signaling is carried through Downlink Control Information (DO) or Media Access Control (MAC) signaling.

* * * * *